(12) United States Patent
Surjan et al.

(10) Patent No.: US 7,053,344 B1
(45) Date of Patent: May 30, 2006

(54) SELF REGULATING FLEXIBLE HEATER

(75) Inventors: James Surjan, St. Charles, IL (US);
Fred A. Kish, deceased, late of Chicago, IL (US); Tilak R. Varma, Grayslake, IL (US); Edward Bulgajewski, Genoa, IL (US); by Antoinette Chiovatero, legal representative, Chicago, IL (US)

(73) Assignee: Illinois Tool Works Inc, Glenview, IL (US)

(*) Notice: Subject to any disclaimer, the term of this patent is extended or adjusted under 35 U.S.C. 154(b) by 0 days.

(21) Appl. No.: 09/889,843

(22) PCT Filed: Jan. 24, 2000

(86) PCT No.: PCT/US00/01702
§ 371 (c)(1),
(2), (4) Date: Jul. 22, 2002

(87) PCT Pub. No.: WO00/43225
PCT Pub. Date: Jul. 27, 2000

(51) Int. Cl.
*H05B 3/54* (2006.01)

(52) U.S. Cl. .................. 219/549; 219/217; 219/528; 219/529; 219/543

(58) Field of Classification Search ................. 219/549, 219/202, 203, 211, 212, 217, 219, 520, 528, 219/529, 538, 543, 546, 547, 548, 553, 505; 392/425, 432, 435
See application file for complete search history.

(56) References Cited

U.S. PATENT DOCUMENTS

| | | | | |
|---|---|---|---|---|
| 3,721,799 A | * | 3/1973 | Carlstrom | 219/212 |
| 3,887,788 A | * | 6/1975 | Seibel et al. | 219/219 |
| 4,032,752 A | * | 6/1977 | Ohmura et al. | 219/553 |
| 4,149,066 A | * | 4/1979 | Niibe | 219/505 |
| 4,399,347 A | * | 8/1983 | Schmitt | 219/203 |
| 4,436,986 A | * | 3/1984 | Carlson | 219/505 |
| 4,533,821 A | * | 8/1985 | Sato | 219/545 |
| 4,665,304 A | * | 5/1987 | Spencer | 219/219 |
| 4,761,541 A | | 8/1988 | Batliwalla et al. | 219/528 |
| 4,845,343 A | * | 7/1989 | Aune et al. | 219/549 |
| 4,857,711 A | * | 8/1989 | Watts | 219/548 |
| 4,868,898 A | | 9/1989 | Seto | 219/528 |
| 5,034,594 A | | 7/1991 | Beezhold et al. | 219/528 |
| 5,081,339 A | | 1/1992 | Stine | 219/217 |
| 5,111,025 A | * | 5/1992 | Barma et al. | 219/217 |
| 5,197,595 A | | 3/1993 | Coultas | 206/0.6 |
| 5,206,482 A | * | 4/1993 | Smuckler | 219/219 |
| 5,405,178 A | | 4/1995 | Weingartner et al. | 297/452.48 |
| 5,422,462 A | | 6/1995 | Kishimoto | 219/545 |
| 5,451,747 A | * | 9/1995 | Sullivan et al. | 219/528 |
| 5,643,480 A | * | 7/1997 | Gustavsson et al. | 219/211 |
| 5,679,277 A | | 10/1997 | Niibe et al. | 219/543 |
| 5,800,483 A | * | 9/1998 | Vought | 607/104 |
| 5,800,595 A | * | 9/1998 | Wright | 206/6 |
| 5,801,914 A | | 9/1998 | Thrash | 361/104 |
| 5,824,996 A | * | 10/1998 | Kochman et al. | 219/529 |
| 5,851,588 A | | 12/1998 | Uthoff, Jr. | 427/228 |
| 5,861,610 A | | 1/1999 | Weiss | 219/497 |
| 5,961,869 A | | 10/1999 | Irgens | 219/549 |
| 6,031,214 A | | 2/2000 | Bost et al. | 219/545 |
| 6,054,690 A | | 4/2000 | Petit et al. | 219/528 |

(Continued)

FOREIGN PATENT DOCUMENTS

| | | |
|---|---|---|
| JP | 2000-333781 | 12/2000 |
| JP | 2004-55219 | 2/2004 |

*Primary Examiner*—Harry Bennett
*Assistant Examiner*—Nihir Patel
(74) *Attorney, Agent, or Firm*—Mark W. Croll; Paul F. Donovan

(57) ABSTRACT

A self-regulating flexible heater for automobiles and other vehicles which is comprised of a breathable substrate (10) to which is applied a coating (14) of a conductive material and a coating (12) of positive temperature coefficient material.

24 Claims, 3 Drawing Sheets

U.S. PATENT DOCUMENTS

| | | | | |
|---|---|---|---|---|
| 6,084,217 A | * | 7/2000 | Bulgajewski | 219/505 |
| 6,093,910 A | | 7/2000 | McClintock et al. | 219/217 |
| 6,097,009 A | | 8/2000 | Cole | 219/528 |
| 6,111,234 A | | 8/2000 | Batliwalla et al. | 219/549 |
| 6,124,577 A | | 9/2000 | Fristedt | 219/497 |
| 6,143,206 A | | 11/2000 | Handa et al. | 252/500 |
| 6,150,642 A | | 11/2000 | Weiss et al. | 219/528 |
| 6,172,344 B1 | | 1/2001 | Gordon et al. | 219/529 |
| 6,189,487 B1 | | 2/2001 | Owen et al. | 119/28.5 |
| 6,194,687 B1 | | 2/2001 | Joseph et al. | 219/217 |
| 6,215,111 B1 | | 4/2001 | Rock et al. | 219/545 |
| 6,220,659 B1 | | 4/2001 | McDowell et al. | 297/180.12 |
| 6,229,123 B1 | | 5/2001 | Kochman et al. | 219/549 |
| 6,307,188 B1 | * | 10/2001 | Bulgajewski | 219/505 |
| 6,353,207 B1 | | 3/2002 | Burt | 219/217 |
| 6,426,485 B1 | * | 7/2002 | Bulgajewski et al. | 219/219 |
| 6,455,823 B1 | * | 9/2002 | Bulgajewski et al. | 219/548 |
| 6,495,809 B1 | * | 12/2002 | Bulgajewski et al. | 219/548 |
| 6,559,422 B1 | | 5/2003 | Burt | 219/217 |

* cited by examiner

SELF REGULATING FLEXIBLE HEATER

FIELD OF THE INVENTION

The invention relates to a self-regulating flexible heater construction suited for use in automobile components but which has use in other applications, including but not limited to furniture pieces, consumer items, construction materials, and other articles. The flexible heater construction is comprised of a breathable fabric substrate to which is applied a coating of a conductive material and a coating of positive temperature coefficient ("PTC") material. The conductive material is in electrical contact with a power source. The PTC material regulates the temperature of the heater.

Within the automotive field, the present invention can be employed as a seat heater and to provide a non-exhaustive list of other applications, as a heater for dashboards, steering wheels, stick shifts (for manual and automatic transmissions), mirrors, arm rests, and others.

BACKGROUND OF THE INVENTION

Heating devices with temperature self-regulating properties are used in the automotive industry. However, such heaters are employed where flexibility of the heater is not at issue. For example, such heaters are used on mirrors located outside of the vehicle. These heaters are printed upon a rigid biaxially oriented polyester film. See, e.g. U.S. Pat. Nos. 4,931,627 and 4,857,711, both assigned to the assignee of the present application.

Heaters for automotive vehicle seats that are currently available offer less than adequate performance due to several undesirable attributes. Current heaters are known to build up static electricity, which damages the heater controller circuit when it is discharged. Another shortcoming is that current seat heater design, in which the heater elements are copper wire and design creates several problems in that heating is localized to the area of the wires, creating an undesirable heating pattern where the areas in the vicinity of the wire are too hot and areas removed from the wire are too cool. Moreover, since the heating wire per se does not possess any means for regulating the temperature (that is, copper wire and the like is incapable of sensing that it has become too hot), a sophisticated temperature controller is required for regulating the temperature of the seat heater. This creates a challenging design problem for the engineer, which could be avoided if the heater construction per se was self-regulating and could increase or decrease the amount of heat produced as necessary.

Furthermore, when heating a seat in an automotive vehicle, it is evident that the seat heater construction must be flexible, durable, and able to withstand the demands of the operating environment, which include the potentially degradative effects of prolonged exposure to heat and the flow of electricity.

It would be desirable if a heater for an automotive seat were deigned so that a uniform amount of heat could be distributed over the area to be heated. Likewise it would be desirable if a seat heater could be designed in which, if desired, the amount of heat delivered to particular area could be varied as a design parameter, so that if it is deemed that certain areas should be warmer than others for a given design (or cooler, as the case may be), the heater could be constructed to accommodate this variation.

Furthermore, since the comfort of a vehicle seat is attributable to its flexibility, it would be desirable if the seat heater construction was flexible so that its presence in the seat complimented the other flexible components of the seat construction. It would be additionally desirable if the seat heater construction incorporated a flexible fabric layer. It would be highly advantageous if the heater components could be applied to the fabric using well known printing and coating techniques, which could be used to construct a heater quickly and easily, and relatively cheaply. Also, application techniques such as printing or coating could be used to make uniform or varying applications of component materials, which could provide for the uniform distribution of heat, or if desired, variations in the amount of heat.

Positive temperature coefficient (PTC) materials exhibit variable electrical resistance with temperature. As the temperature of the material increases, the electrical resistance also increases. The resistivity of the material increases so current flow is reduced, limiting heat flow. In essence, positive temperature coefficient compositions are used to form temperature self-regulating coatings. PTC materials are known in the art. Exemplary disclosures concerning these materials can be found in U.S. Pat. Nos. 5,206,482 and 5,151,747, among others.

SUMMARY OF THE INVENTION

The present invention is directed to a self regulating flexible heater, such as a heater for use in automobiles and other vehicles, in which a PTC material and conductive material are applied to a woven or non-woven fabric that is constructed of natural or synthetic fibers.

An electrical buss system of a conductive material is applied over a fabric before or after being coated with a PTC material. The conductive material is applied in an interdigitating pattern emanating from multiple buss bars. The buss bars are configured such that the heater offers uniform heating across the surface of the heater. The amount of heat generated may also be varied as a design parameter so that certain regions generate more or less heat as desired. The buss bars can be connected to the power source by a variety of interconnection devices such as fasteners, terminals conductive epoxies, to name a few of a broad range of interconnecting means that would be within the realm of the skilled artisan. Wire connectors are attached to the terminals and the wire from the power source. Preferably, a secondary layer is applied over the heater construction, such as an adhesive layer or a breathable fabric. The breathable fabric may be one that is breathable by virtue of the material that is used, or one that is machined to be breathable, such as by needle punching.

The heater element is applied just under the external layer of the vehicle seat, preferably as close to the end user as possible. The heater element is placed on the base of the seat, or on the back of the seat, or both. Preferably, the coating of PTC material has a weight 7 to 20 lbs per ream (that is, 3300 ft.$^2$) and a surface resistivity of 2 to 10 kilo-ohms as measured by mulitimeter probes set 1 cm apart. More preferably the coating of PTC material has a surface resistivity of 3 to 8 kilo-ohms as measured by mulitimeter probes set 1 cm apart.

Suitable materials for the fabric substrate include woven and non-woven fabric constructions of material including but not limited to polyesters, polyamides, polyaramids, polyimides, polyetherketones, glass fibers, phenolics, and carbon fibers. With respect to the fabric selection process, it has been found that heater constructions having a bulk density of about 0.6 g/cm$^3$ or greater and a thermal diffusivity of about 0.003 cm$^2$/s or greater insures a desirable degree of conductivity and heat flow through the fabric. This can be achieved using multifilaments with a relatively high number of twists per inch. However, a high degree of twists, or even using high denier fibers, reduces fabric flexibility. Accordingly, the skilled artisan should strike a balance between these properties.

The heating element may comprise a coating formed from a composition of a conductive material of electrically conductive particles dispersed in a polymer matrix, and a coating of a PTC material. In the self-regulating heater of the present invention, the heating element is in thermal communication with the component to be heated, such as the automobile seat. Preferably, the PTC material is coated onto a woven or non-woven fabric. The conductive material is applied, either before or after the PTC material is applied. The conductive material is coated onto the fabric in an interdigitating pattern of electrodes which forms an electrical buss system, which can be constructed in a variety of patterns, such as in a tapered shape (see e.g., FIG. 1), a stepped shaped, in which size varies in a step arrangement, or in a straight, or constant size over the entire construction. (see e.g., FIG. 3) A trim pattern is also possible in which voids are present in the busses at preselected locations. The edges of the buss system are connected to multiple buss bars in electrical contact with a power source.

In one aspect of the present invention, the self-regulating flexible heater is a coated fabric whose construction has a bulk density of about 0.6 g/cm$^3$ or greater and a thermal diffusivity of about 0.003 cm$^2$/s.

In another aspect of the invention, an encapsulating coating, which may be a flame retardant coating, is applied over the heater elements by lamination or the or other known techniques.

DETAILED DESCRIPTION OF THE PREFERRED EMBODIMENT

Figure 1:
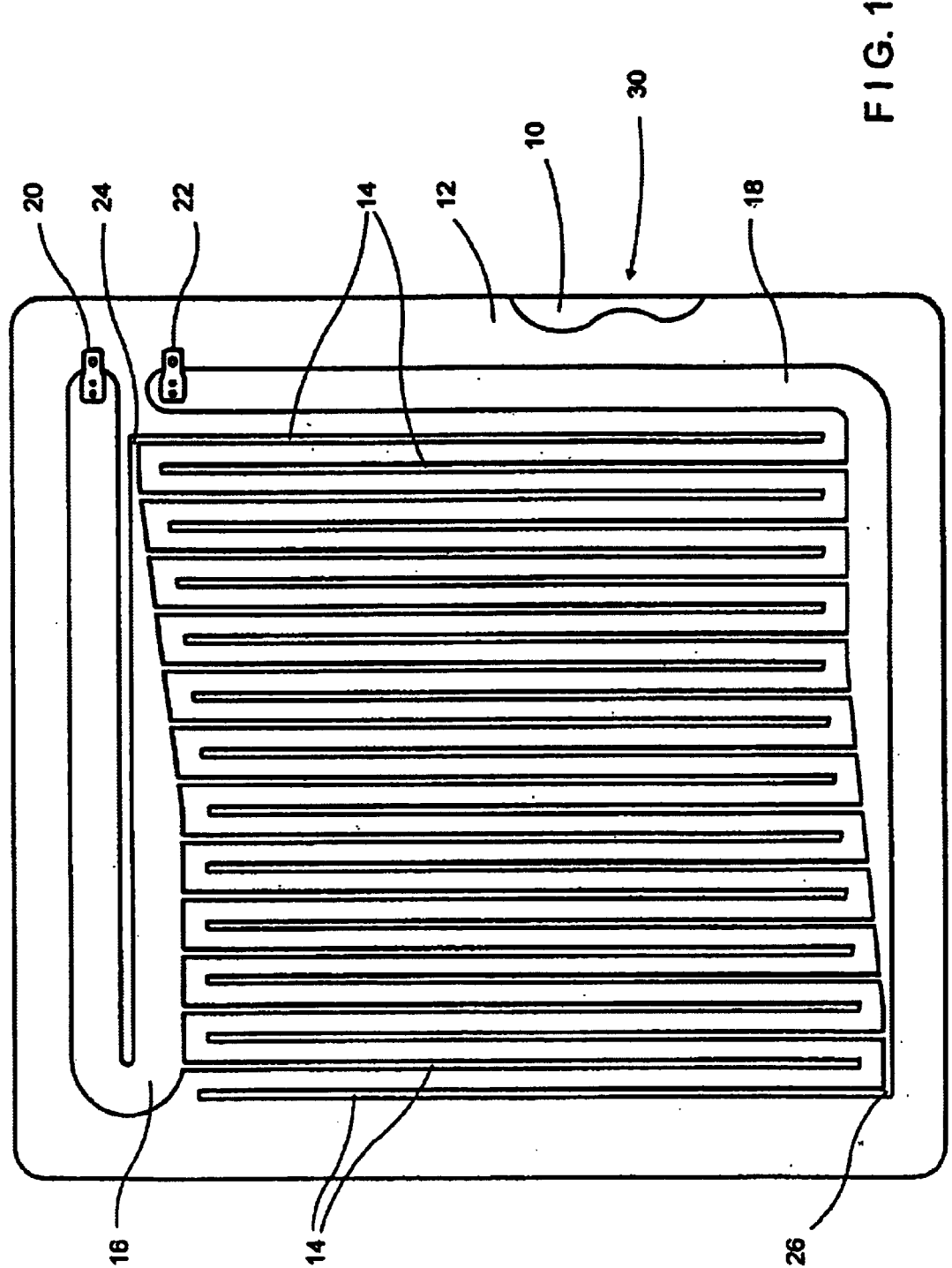
FIG. 1 is a top plan view showing the heater of the present invention.

In the preferred embodiment, a polyester woven or non-woven fabric 10 of a density of about 1 to 6 ounces per square yard (more preferably, about 3.7 ounces per square yard) is coated with a PTC material 12 such as commercially available PTC coating materials, such as an ethylene-vinyl acetate co-polymer resin available as Dupont 265. Such materials are described in U.S. Pat. No. 4,857,711, incorporated herein by reference. The coating is applied at a weight of 13 lb per ream (that is, 3300 ft.$^2$) and resistivity of 2 to 10 kilo-ohms (more preferably, 3 to 8 kilo-ohms) as measured by mulitimeter probes set 1 cm apart.

Prior to application of the conductive material, the fabric is fully dried. The PTC layer 12 and conductive layer 14 are applied as discreet layers in any order of application. The conductive material 14 may be formulated from polymeric resins such as vinyls, polyesters, acrylics and conductive material such as silver pigment, a silver coated copper pigment, or plated copper pigments and/or solvating materials such as organic solvents, and water-based solvents which contain the conductive material. After thorough mixing, the coating is passed through a mill to effect final dispersion. Other conductive materials may be used such as conductive woven wires fixed within the construction by conductive glues. The applicants have found that these formulations are flexible while resisting cracking when bearing a load and when stretched.

The conductive material 14 is preferably applied in an interdigitating pattern (see FIG. 1) by a screen printing method, then fully dried, thereby forming an electrical buss system. Other methods may be used to apply the conductive material, including spraying, draw down applications, web printing, or other printing methods that provide a uniform coating. The conductive material is printed in electrode patterns which are interdigitated. Each electrode of the pattern is in electrical contact with one of a multiple of buss bars 16 and 18, with adjacent electrodes alternating their connection between buss bars 16 and 18. The buss bars are configured in a decreasingly tapered arrangement. That is the width of the buss bars gradually decreases from the terminal end (20, 22) to the free end (24, 26). This insures that the electrical resistance created by the buss bars will create a heating effect that is substantially the same as that created by the heating areas. One knowing the electrical characteristics of the PTC material, conductive material and temperature requirements can readily design heating areas of varying sizes and shapes with varying buss sizes that can deliver varying amounts of heat over the heating area. Accordingly, the entire substrate, from the center out of the periphery, including those areas beneath the buss bars, will be heated as desired with substantially no cold spots. It should be noted that while the connections to the heater construction are positioned along its edges, other configurations are possible, such as making a connections from the interior of the construction, or a combination of connections along the edges and in the interior.

Power across the heater construction can be varied by varying the spacing of the smaller busses, That is, the skilled artisan would readily appreciate that doing so would vary the power at any given location in the construction.

Figure 2:
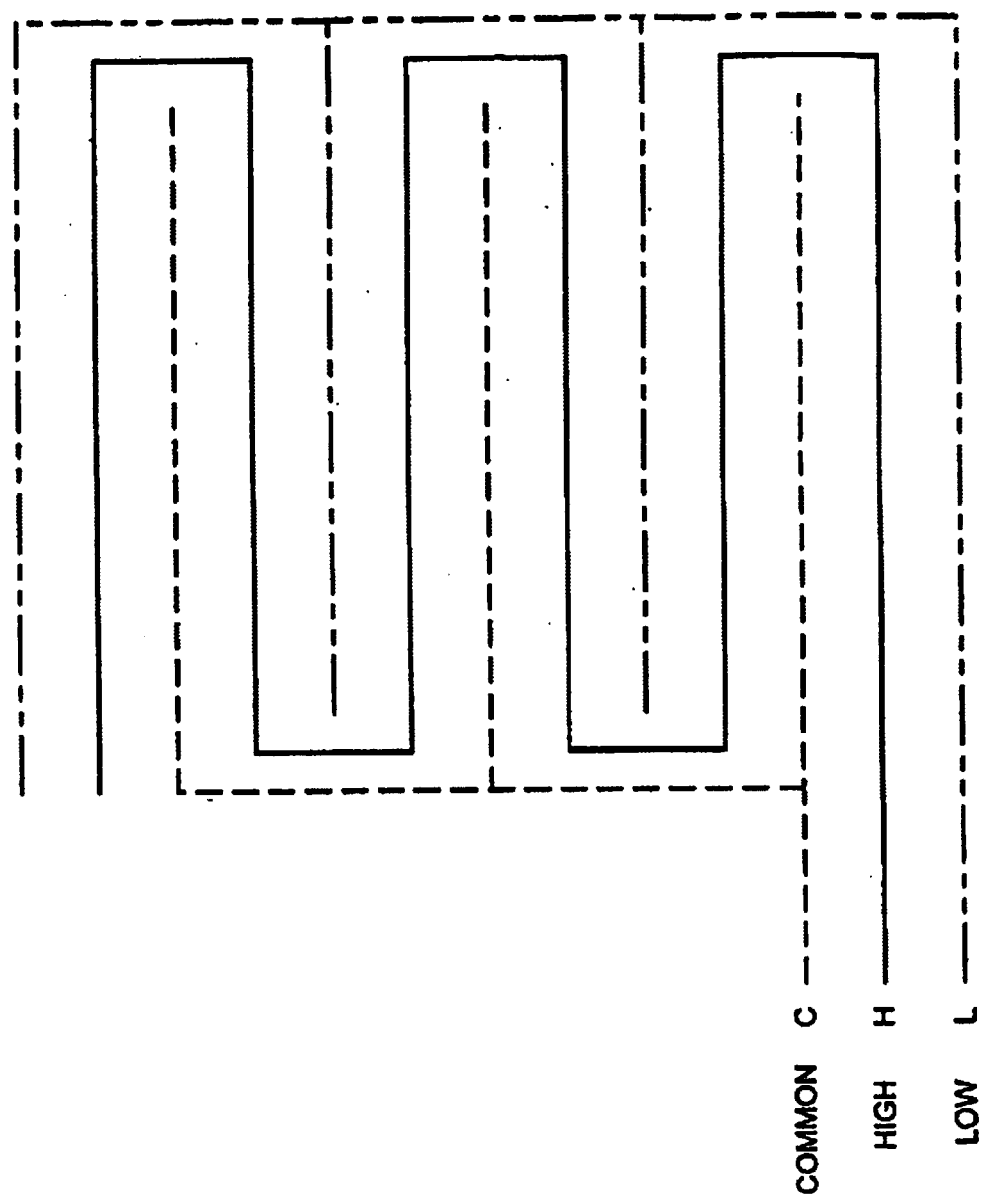
FIG. 2 is a top plan view of the circuit of a dual wattage self-regulating flexible heater construction.

FIG. 2 shows a circuit diagram for a self-regulating flexible heater design in accordance with the present invention which provides for a multiple wattage heater. As shown in this design, high/low settings are possible where current flows from either common to high buss arrangement or a common to low buss arrangement. Other combinations are possible based on other terminal connections.

Terminals 20 and 22 are attached to the buss bars and are in communication with a power source (not shown). The terminals may be attached to the buss bars 16 and 18 by fasteners or any other means that will permit an electrical contact to be formed. A secondary protective layer, such as an encapsulating layer, may be laminated over the heater assembly 30.

When a voltage is applied across the terminals and across the electrode array, depending upon the ambient temperature and the electrical characteristics of the PTC material, current will flow through the PTC material between the electrodes, generating heat in the individual heating areas. The current flow and heating effect of the PTC material depends on its temperature which will change as the ambient temperature changes and, at a predetermined temperature of the PTC material, the resistivity of the material increases causing the material to no longer conduct current, whereby the heating areas no longer generate heat, or to produce a very low amount of heat due to a significantly reduced current flow. Accordingly, it can be seen that the heater is self-regulating in accordance with the surrounding ambient temperature.

Figure 3:
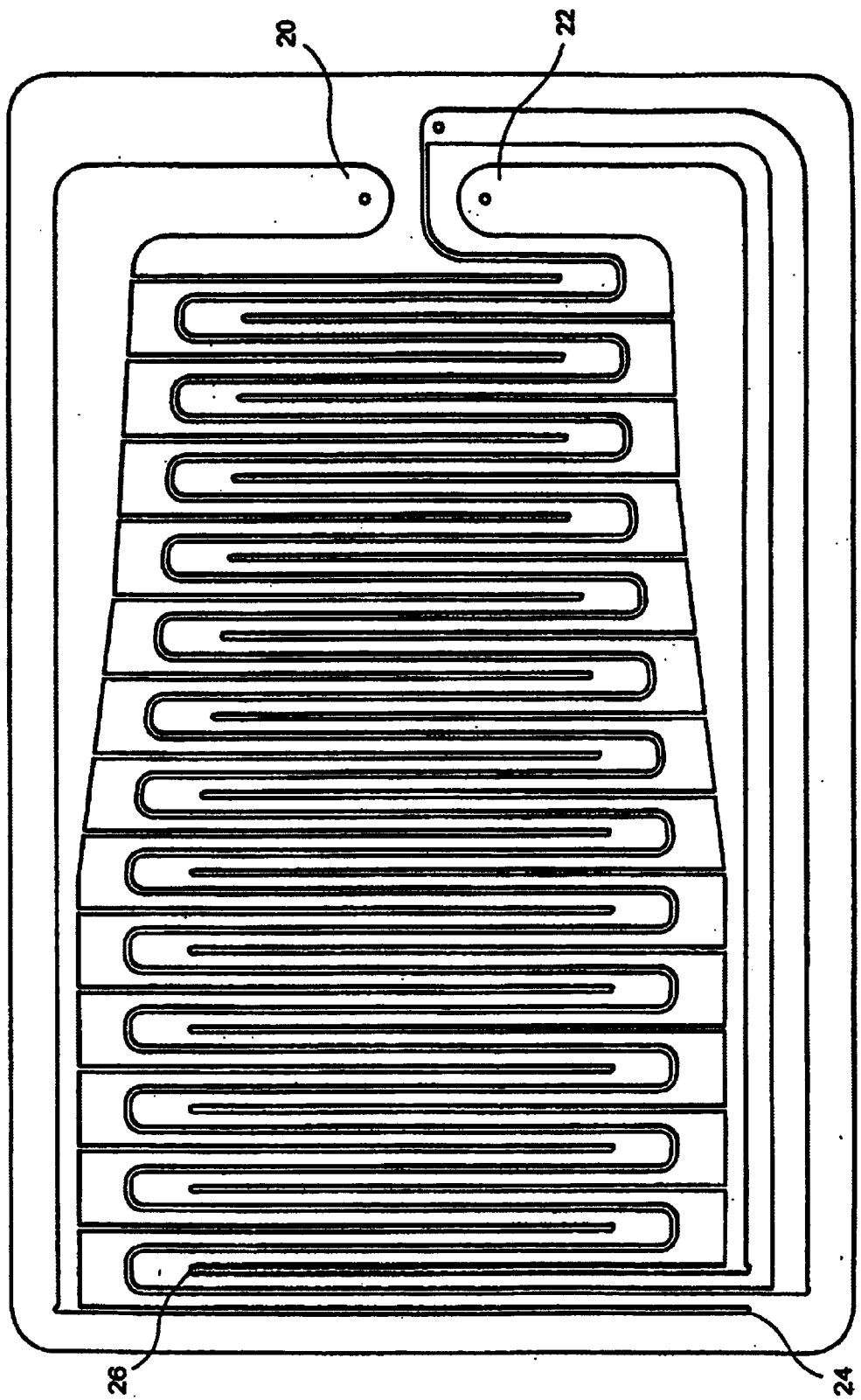
FIG. 3 is a top plan view of a self-regulating flexible heater construction having a tapered and straight buss bar arrangement.

FIG. 3 depicts an alternative arrangement in which the width of the buss bars is a combination of a section where the size remains constant near the free end (24, 26), and a tapered section where the buss bars gradually decrease in size further away from the terminal end (20, 22).

The skilled artisan will readily appreciate that placing a safety switch at the terminals will prevent run away conditions during which the heat generated exceeds the upper limit that has been set in the design of the heater. The switch can be a simple on-off switch that permits the user to turn off the current flowing through the heater.

EXAMPLE 1

The thermal diffusivity of five coated polyester fabric sample was determined.

The samples, identified as 1 through 5, differed in terms of the whether they are woven or non-woven, and if woven, the weave pattern, number of picks per inch, ends per inch, number of filaments in the warp and filling yarns, and twists per inch in the yarns. These fabrics were submitted as strips of coated fabric approximately 500 mm long by 70 mm wide. Samples 12.7 mm in diameter were die cut from the strips for testing.

Thermal diffusivity of the samples was measured att 10° and 100° by the laser flash method utilizing a Holometrix Microflash instrument available from Holometrix Micromet. This instrument and method conform to ASTM E1461-92, "Standard Test Method for Thermal Diffusivity of Solids by the Flash Method". The test results are given after a description of the experimental procedure.

Thermal diffusivity is related to the steady-state thermal conductivity through the equation $$D = \frac{\lambda}{C_p \rho}$$

where D is the thermal diffusivity, $\lambda$ is the thermal conductivity, $C_p$ is the specific heat, and $\rho$ is the density. The diffusivity is a measure of how quickly a body can change its temperature; it increases with the ability of a body to conduct heat ($\lambda$) and it decreases with the amount of heat needed to change the temperature of a body ($C_p$). All three quantities on the right hand side of Equation (1), as well as the thermal diffusivity, can be functions of temperature.

The measurement of the thermal diffusivity of a material is usually carried out by rapidly heating one side of a sample and measuring the temperature rise curve on the opposite side. The time that it takes for the heat to travel through the sample and cause the temperature to rise on the rear face can be used to measure the through-plane diffusivity and calculate the through-plane thermal conductivity if the specific heat and density are known.

Through-Plane Method and Analysis

The sample is a disk with a standard diameter of 12.7 mm and a thickness ranging from about 0.1 to 3 mm. With the Holometrix Thermaflash 2200 Laser Flash system, the sample disk is aligned between a neodymium glass laser (1.06 µm wavelength 330 µs pulse width) and an indium antimonide (InSb) IR detector in a tantalum tube furnace. A type C thermocouple in contact with the sample controls the sample and its surroundings at any temperature between 20 and 2000° C. Once the sample has been stabilized at the desired temperature, the laser is fired several times over a span of a few minutes and the necessary data is recorded for each laser "shot". The laser beam energy strikes and is absorbed by the front surface of the sample, causing a heat pulse to travel through the thickness of the sample. The resulting sample temperature rise is fairly small, ranging from about 0.5 to 2 degrees C. This temperature rise is kept in the optimum range by adjustable filters between the laser and the furnace. A lens focuses the back surface image of the sample onto the detector and the temperature rise signal vs. time is amplified and recorded with a high speed A/D converter.

Conductivity

The sample thermal conductivity can be calculated with Equation (1), after a measurement of the diffusivity as described above, and with measurements of the sample specific heat and bulk density. The bulk density is normally calculated from the measured sample volume (calculated from the measured dimensions) and mass.

Test Results

The measured values of thickness, bulk density and thermal diffusivity are given in table 1 below. The results have not been corrected for thermal expansion. The samples were coated with approximately 5 µm of graphite for thermal diffusivity testing. The second column from the right in Table 1 lists the standard deviation as a percentage of the mean diffusivity for the five to ten laser "shots" taken for each data point. The bulk density values are estimated to be accurate to within ±5%.

TABLE 1

Laser Flash Thermal Diffusivity Results

| Sample | Thickness @ 25° C. (mm) | Bulk Density @ 25° C. (g/cm³) | Temperature Tested (° C.) | Thermal Diffusivity α (cm²/s) | Fabric Type |
|---|---|---|---|---|---|
| 1 | 0.288 | 0.634 | 10 | 0.00360 | B-3 |
|   |       |       | 100 | 0.00297 | Polyester |
| 2 | 0.180 | 0.555 | 10 | 0.00647 | B-2 |
|   |       |       | 100 | 0.00562 | Polyester |
| 3 | 0.220 | 0.677 | 10 | 0.00617 | IFC 322-222 |
|   |       |       | 100 | 0.00505 | Polyester |
| 4 | 0.269 | 0.510 | 10 | 0.00242 | non- |
|   |       |       | 100 | 0.00205 | Woven Polyester |
| 5 | 0.556 | 0.910 | 10 | 0.00255 | PUR |
|   |       |       | 100 | 0.00203 | Coated Polyester |

Note:
Thermal Diffusivities are an average of 5 readings.

EXAMPLE 2

The five polyester test samples discussed in example 1 were tested to determine if they would break down when subjected to extended period of operation. The samples were coated with PTC material. After drying a silver pigment was applied on top of the PTC material. These self-regulating flexible heater constructions were subjected to a 12 volt DC potential for an extended, continuous period. Heat continued to rise in the constructions, until steady state was attained for construction nos. 1 and 3. These constructions exhibited sufficient heat resistance. Constructions 2, 4 and 5 were destroyed before reaching steady state. That is, the "failed" heater constructions burned up during testing as a result of heat generated during heater operation. It is noted that the fabrics which passed exhibited a bulk density of at least about 0.6 g/cm³ or greater and a thermal diffusivity of at least about 0.003 cm²/s.

| Sample | Thickness @ 25° C. (mm) | Bulk Density 25° C. (g/cm³) | Temperature Tested (° C.) | Thermal Diffusivity α (cm²/s) | Fabric Type | Heater Construction Pass/Fail |
|---|---|---|---|---|---|---|
| | | | Laser Flash Thermal Diffusivity Results | | | |
| 1 | 0.288 | 0.634 | 10 | 0.00360 | B-3 | Barely |
| | | | 100 | 0.00297 | Polyester | Passed |
| 2 | 0.180 | 0.555 | 10 | 0.00647 | B-2 | Failed |
| | | | 100 | 0.00562 | Polyester | |
| 3 | 0.220 | 0.677 | 10 | 0.00617 | IFC 322-222 | Passed |
| | | | 100 | 0.00505 | Polyester | |
| 4 | 0269 | 0.510 | 10 | 0.00242 | non- | Failed |
| | | | 100 | 0.00205 | Woven Polyester | |
| 5 | 0.556 | 0.910 | 10 | 0.00255 | PUR | Failed |
| | | | 100 | 0.00203 | Coated Polyester | |

Note:
Thermal Diffusivities are an average of 5 readings.

With respect to the fabric selection process, it has been found that heater constructions having a bulk density of about 0.6 g/cm³ or greater and a thermal diffusivity of about 0.003 cm²/s or greater insures a desirable degree of conductivity and heat flow through the fabric. This can be achieved using multifilaments with a relatively high number of twists per inch. However, a high degree of twists, or even using high denier fibers, reduces fabric flexibility. Accordingly, the skilled artisan should strike a balance between these properties.

Though described in its preferred embodiment as a seat heater for automobiles, it should be understood that the self-regulating flexible heater construction of the present invention is suited for use not only in automobile components but has use in other applications, including but not limited to furniture pieces, consumer items, construction materials, and other articles. Accordingly, the preceding disclosure should be read as providing context to the invention, and not as a limitation on the field of use thereof.

Having described the preferred construction of the invention, those skilled in the art having the benefit of the description, can readily devise other modifications and such other modifications are to be considered to be within the scope of the appended claims.

What is claimed is:

1. A self regulating flexible heater construction for producing heat when connected to an electrical power source, comprising:
    a flexible fabric substrate conformable to the shape of a contiguous flexible surface to be heated;
    a layer of a positive temperature coefficient material; and
    a layer of a conductive material, wherein the fabric construction has a bulk density of about 0.6 g/cm³ or greater and a thermal diffusivity of about 0.003 cm²/s or greater.

2. The heater of claim 1 wherein at least one of the layers is applied to the heater in an interdigitated pattern.

3. The heater of claim 2 wherein the substrate is woven or non-woven fabric.

4. The heater of claim 2 wherein the layer of conductive material is applied to the layer of positive temperature coefficient material in an interdigitated pattern.

5. The heater of claim 2 wherein the layer of positive temperature coefficient material is applied to the layer of conductive material in an interdigitated pattern.

6. The heater of claim 2 wherein the density of the fabric is 1 to 6 ounces per square yard.

7. The heater of claim 2 wherein the PTC material is comprised of a polyolefin resin.

8. The heater of claim 2 wherein the coating of PTC material has a weight 7 to 20 lbs. per ream.

9. The heater of claim 2 wherein the positive temperature coefficient material has a surface resistivity of 2 to 10 kilo-ohms as measured by multimeter probes set 1 cm apart.

10. The heater of claim 2 wherein the positive temperature coefficient material has a surface resistivity of 3 to 8 kilo-ohms as measured by multimeter probes set 1 cm apart.

11. The heater of claim 2 wherein the conductive material is formulated from a mixture of a polymeric resin selected from the group consisting of vinyls, polyesters, acrylics and a conductive material selected from the group consisting of silver pigment, a silver coated copper pigment, or plated copper pigments.

12. The heater of claim 2 wherein the conductive material is formulated from a mixture of solvating materials selected from the group consisting of organic solvents and water based solvents and a conductive material selected from the group consisting of silver pigment, a silver coated pigment, or plated copper pigments.

13. The heater of claim 2 wherein the conductive material is constructed of conductive wires fixed within the construction by conductive glues.

14. The heater of claim 1 wherein at least the layer of conductive material is applied tothe substrate by screen printing, spraying, draw down, web printing or any other printing method capable of providing a uniform coating.

15. The heater of claim 1 further comprising
    a plurality of buss bars in electrical contact with the conductive material and an electrical power source.

16. The heater of claim 15 wherein the buss bars have a width dimension and a length dimension, and wherein the width decreases over at least a portion of its length.

17. The heater of claim 15 wherein the buss bars have a width dimension and a length dimension, and wherein the width remains constant over at least a portion of its length.

18. The heater of claim 15 wherein the buss bars have a width dimension and a length dimension, and at least one void at a preselected location along its length.

19. The heater of claim 15 wherein the buss bars have a width dimension and a length dimension, and wherein the width dimension increases step-wise over at least a portion of its length.

20. The heater of claim 15 wherein the spacing of the busses varies across the heater.

21. The hearter of claim 2 further comprised of an overlayer of a laminated or sewn secondary breathable woven or non-woven fabric comprised of natural or synthetic fibers which covers the heater.

22. A self regulating flexible heater construction for producing heat when connected to an electrical power source, comprising:
- a flexible fabric substrate conformable to the shape of a contiguous flexible surface to be heated;
- a layer of a positive temperature coefficient material;
- a layer of a conductive material, wherein at least one of the layers is applied to the heater in an interdigitated pattern;
- an overlayer of a laminated or sewn secondary breathable woven or non-woven fabric comprised of natural or synthetic fibers which covers the heater, wherein the overlayer is an encapsulating coating, which may be a flame retardant coating, which is applied over the heater; and
- wherein the heater is incorporated within the construction of a seat for an automobile.

23. A self regulating flexible heater construction for producing heat when connected to an electrical power source, comprising:
- a flexible fabric substrate conformable to the shape of a contiguous flexible surface to be heated;
- a layer of positive temperature coefficient material; and
- a layer of conductive material, wherein the heater has a multiple buss design providing for high and low current settings, comprised of at least a common setting buss, a low setting buss, and a high setting buss, in which current flows from either the common setting buss to high setting buss or from the common setting buss to low setting buss.

24. The heater of claim 1 wherein the fabric construction includes the flexible fabric substrate and the layer of positive temperature coefficient material.

* * * * *